US007055967B2

(12) United States Patent
Bierhuizen (10) Patent No.: US 7,055,967 B2
(45) Date of Patent: Jun. 6, 2006

(54) ILLUMINATION SYSTEMS EMPLOYING CORRECTIVE OPTICS FOR USE IN REDUCED ÉTENDUE COLOR VIDEO PROJECTION SYSTEMS

(76) Inventor: Serge J. A. Bierhuizen, P.O. Box 1726, Santa Rosa, CA (US) 95402

( * ) Notice: Subject to any disclaimer, the term of this patent is extended or adjusted under 35 U.S.C. 154(b) by 40 days.

(21) Appl. No.: 10/677,198

(22) Filed: Oct. 1, 2003

(65) Prior Publication Data
US 2004/0070841 A1  Apr. 15, 2004

Related U.S. Application Data

(63) Continuation-in-part of application No. 10/150,527, filed on May 17, 2002, now Pat. No. 6,839,095.

(51) Int. Cl.
G03B 21/28 (2006.01)
G03B 21/26 (2006.01)
G02F 1/1335 (2006.01)
G02B 5/10 (2006.01)
G02B 27/30 (2006.01)
G02B 5/32 (2006.01)
F21V 7/04 (2006.01)

(52) U.S. Cl. ............................. 353/98; 353/37; 349/8; 359/853; 359/858; 359/641; 359/20; 362/341

(58) Field of Classification Search ............ 353/98–99, 353/37; 349/5, 8; 359/853, 858, 641, 20; 362/341, 555, 560–561
See application file for complete search history.

(56) References Cited

U.S. PATENT DOCUMENTS

| 5,414,600 | A | 5/1995 | Strobl et al. ................. 362/551 |
| 5,526,063 | A | 6/1996 | Joubert et al. |
| 5,707,131 | A | 1/1998 | Li ............................. 362/551 |
| 5,829,858 | A | 11/1998 | Levis et al. ................. 353/122 |
| 5,967,636 | A | 10/1999 | Stark et al. .................... 353/84 |
| 6,005,722 | A | 12/1999 | Butterworth et al. ........ 359/712 |
| 6,025,890 | A | 2/2000 | Chase ............................ 349/9 |
| 6,034,818 | A | 3/2000 | Sedlmayr ..................... 359/497 |
| 6,227,682 | B1 | 5/2001 | Li ............................. 362/302 |
| 6,243,152 | B1 | 6/2001 | Knox et al. .................... 349/86 |
| 6,327,093 | B1 | 12/2001 | Nakanishi ..................... 359/634 |
| 6,362,922 | B1 | 3/2002 | Tadic-Galeb et al. ........ 359/649 |
| 6,388,718 | B1 | 5/2002 | Yoo et al. ....................... 349/9 |
| 6,390,626 | B1 | 5/2002 | Knox ........................... 353/20 |
| 6,476,880 | B1 | 11/2002 | Tsujikawa ..................... 349/9 |
| 6,585,380 | B1 * | 7/2003 | Yamamoto ..................... 353/98 |
| 6,739,726 | B1 | 5/2004 | Li ............................. 353/98 |
| 6,840,623 | B1 * | 1/2005 | Li ............................. 353/20 |
| 2002/0149750 | A1 | 10/2002 | Kane |

FOREIGN PATENT DOCUMENTS

EP     0 603 583 A    6/1994

* cited by examiner

Primary Examiner—W. B. Perkey
Assistant Examiner—Magda Cruz
(74) Attorney, Agent, or Firm—Berkeley Law & Technology Group (57) ABSTRACT

An illumination system is provided with at least a first arc lamp positioned on the first axis of a first reflecting device. An aspherical corrector plate is positioned to receive the light rays produced by the arc lamp. The aspherical corrector plate is shaped so that it provides a substantially constant magnification of the arc as a function of the range of reflection angles of light rays off of the reflecting device.

44 Claims, 7 Drawing Sheets

ILLUMINATION SYSTEMS EMPLOYING CORRECTIVE OPTICS FOR USE IN REDUCED ÉTENDUE COLOR VIDEO PROJECTION SYSTEMS

RELATED APPLICATION

This application is a continuation-in-part of application Ser. No. 10/150,527, now U.S. Pat. No. 6,839,095 for SINGLE PATH COLOR VIDEO PROJECTION SYSTEMS EMPLOYING REFLECTIVE LIQUID CRYSTAL DISPLAY DEVICES.

FEDERALLY SPONSORED RESEARCH OR DEVELOPMENT

Not applicable.

TECHNICAL FIELD

This invention relates to color video projection systems and more particularly to light source illumination uniformity correctors suitable for use in such systems with low étendue.

BACKGROUND OF THE INVENTION

Multimedia projection systems have become popular for purposes such as conducting sales demonstrations, business meetings, classroom training, and for use in home theaters. In typical operation, multimedia projection systems receive analog video signals from a video unit and convert the video signals to digital information to control one or more digitally driven light valves. Depending on the cost, brightness, and image quality goals of the particular projection systems, the light valves may be of various sizes and resolutions, be transmissive or reflective, and be employed in single or multiple light path configurations. (Hereinafter, projection systems may also be referred to as "projectors.")

Optimized sets of multimedia projector characteristics have been achieved by employing reflective light valves, the most common types of these reflective light valve optical arrangements are deflected mirror arrays and reflective liquid crystal light valves. Deflected mirror arrays are very efficient reflectors that do not require polarizers for operation. However, they are quite expensive, require off-axis illumination, and often employ unusual optical elements, such as specialized prisms, to compensate for the off-axis light path angles generated.

Reflective liquid crystal light valves are typically fabricated on a silicon substrate and are, therefore, referred to as liquid crystal on silicon (LCOS) light valves. They are much less expensive than reflected mirror devices, but require specialized polarizers for operation, which results in significant light transmission losses.

LCOS light valve-based projector architectures employ linear polarized light-sensitive devices for receiving light from a randomly polarized light source, reflecting the light off the light valves, and redirecting the reflected light, depending on its polarization direction or state, either out through a projection lens or back toward the light source. The polarization state of the light is determined by an electronic image pattern applied to the light valve.

There are several different optical architectures for employing LCOS light valves. One variation is a multipath optical architecture that provides a separate path for each of the primary color (red, blue and green) lights. The different color lights are routed through a series of polarization beam splitters, filters, and wave plates to a color specific reflective LCOS light valve. Polychromatic light is optically divided to provide each of the three pathways with its associated color light. A light valve, which is provided in each pathway, is modulated with its respective color data. The individual pathways are then recombined into a converged projected color image. Another variation is a single-path multimedia projector that typically includes a color wheel-based frame-sequential color (FSC) optical arrangement. In this arrangement, polychromatic light rays emitted by a light source are directed through the color filter segments of the color wheel. The resulting FSC light travels along a single light path that color timeshares a single light valve.

The multipath optical architecture generally provides an increased image brightness compared to the single-path architecture. Image brightness is also a function of the amount of collected light from the lamp and the color efficiency, which is generally lower for the single-path architecture. Nevertheless, the single-path architecture is generally preferred because the resulting systems tend to be lighter weight, lower cost, and more compact in size. All of these factors can be further improved if the light produced by the lamp (light source) can be collected efficiently and propagated through the optical components optimized for a low étendue, which enables using reduced-size optical components.

Figure 1:
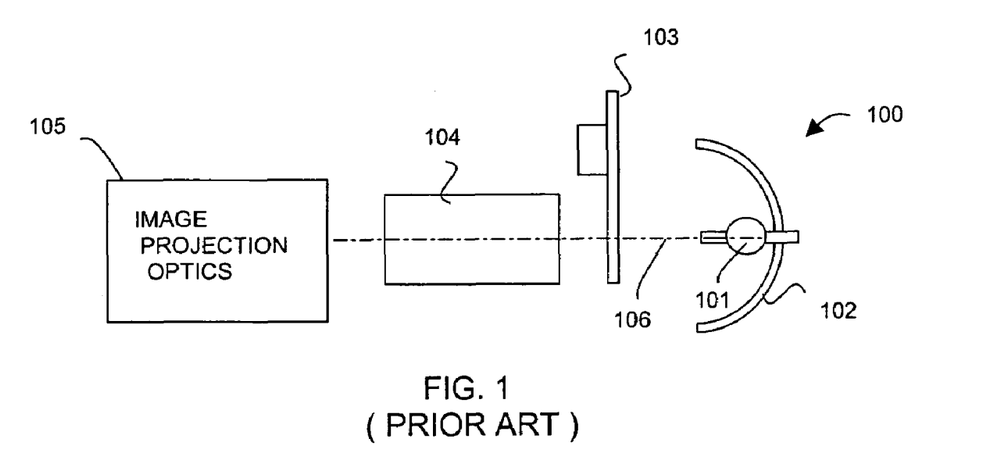
FIG. 1 is a simplified pictorial plan view of a prior art multimedia projector system using a standard conic reflector.

FIGS. 1–6 illustrate these problems in further detail. In particular, FIG. 1 shows a prior art example of a conventional light source 100 used in conjunction with a single-path architecture. The light source includes an arc lamp 101 mounted at a focus of an elliptical reflector 102. Polychromatic light rays emitted by arc lamp 101 are converged by elliptical reflector 102 to propagate along optical axis 106 through color filter segments of color wheel 103 and light integrator 104. Color wheel 103 preferably includes R, G, B and light-purplish filter segments. Because the light from arc lamp 101 is typically greenish (deficient in red), the light-purplish (non-white) filter segment produces a more accurate white color point and overall color gamut for multimedia projector. Alternatively, the color wheel 103 could be replaced with other types of color modulators, such as a liquid crystal-based color switcher. After the FSC light passes through the color wheel 103, it passes through a light integrator before it enters the remaining components of an image projection system 105.

One of the functional purposes of an illumination system is to output a large amount of light energy. However, the emitted light energy is restricted by constraints on the physical dimensions of the light source as well as the amount of light acceptable by downstream optical components. The amount of light that is acceptable to an optical component is a function of its area and the light flux throughput, or étendue. The geometric entity, étendue E, is defined as the product of the transverse sectional area of a light beam and the divergence angle of the beam. Étendue is also referred to as geometric extent.

Figure 2:
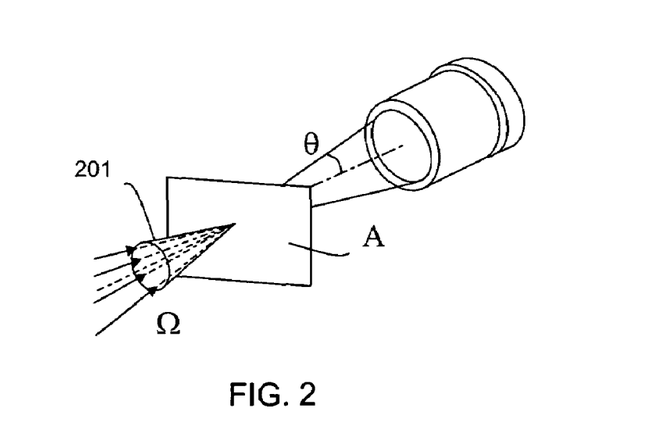
FIG. 2 is a simplified pictorial representation of parameters defining the étendue of a light ray bundle.

Referring to FIG. 2, étendue E is a geometric entity that is represented mathematically by Eq. 1:

$$E = \int\int \cos(\phi) dA d\Omega = A\Omega = A\pi\sin^2(\theta) = \frac{A\pi}{4(f/\#)^2}, \qquad \text{Eq. 1}$$

where Ω defines a cone of light 201 diverging through a cross-sectional area A. f/# is a measure of the relative aperture of a lens, the square of which measures the area of the light gathering capacity.

Étendue is important because in an optical system it cannot be reduced without a corresponding reduction in light flux. It is of particular importance in the efficient collection of light flux from a light source, such as light source 100, which effectively establishes the lower limit of étendue for the entire optical system.

Figure 3:
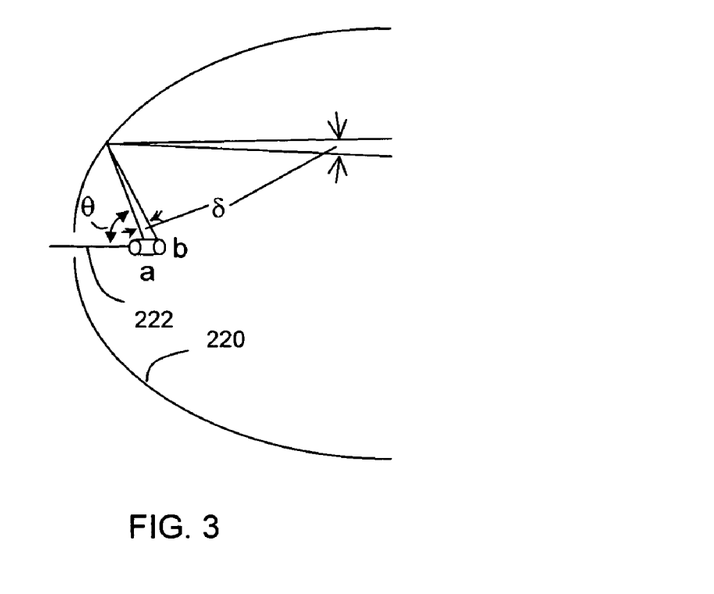
FIG. 3 is a simplified pictorial representation of parameters defining the prior art imaging by a reflector of a light source arc.

FIG. 3 shows a typical reflector 220, such as a parabolic or elliptical reflector (similar to the one used in FIG. 1) which is a major component establishing the intensity of light rays exiting a light source. A numerical aperture NA of the light exiting reflector 220 depends on an angle θ from which the light rays exit reflector 220 relative to an optical axis 222. As shown below in Eqs. 2, 3, and 4, the theoretical maximum numerical aperture occurs at about θ=60°.

$$4f(f-r\cos(\theta))=r^2\sin^2(\theta), \quad \text{Eq. 2}$$

$$r = \frac{2f}{1+\cos(\theta)}, \text{ and} \quad \text{Eq. 3}$$

$$NA(\theta) = \sin(\delta) \approx \frac{1/2\, a\sin(\theta)}{r} = \frac{a}{4f}\sin(\theta)(1+\cos(\theta)), \quad \text{Eq. 4}$$

where f is the reflector focal length, a is the length of an arc lamp arc, and δ is the ray divergence angle resulting from arc length a.

Figure 4:
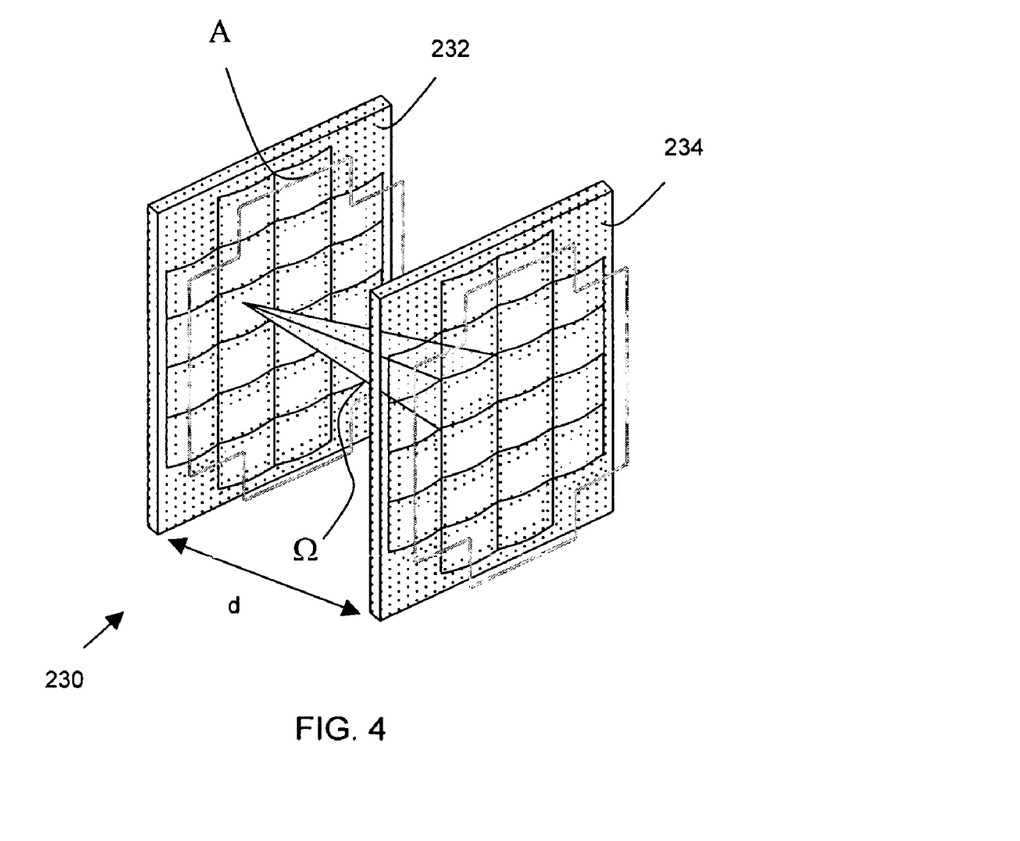
FIG. 4 is a simplified pictorial representation of parameters defining the étendue of a light ray bundle propagating through first and second lenslet arrays of a light integrator in a prior art illumination system.

Étendue is also impacted by light-integrating components such as light tunnels and lenslet arrays that are typically employed to improve the uniformity of light rays exiting light sources. FIG. 4 shows a typical lenslet array light integrator 230 having first and second integrator plates 232 and 234. The limiting étendue E of light integrator 230 may be represented by Eq. 5:

$$E = A\Omega = \frac{A_{lens1} A_{int2}}{d^2}, \quad \text{Eq. 5}$$

where A is the aperture area, Ω is the solid angle of the transmitted beam, $A_{lens1}$ is the area of the first integrator plate 232, $A_{int2}$ is the area of the second integrator plate, and d is the distance between the two plates.

Figure 5:
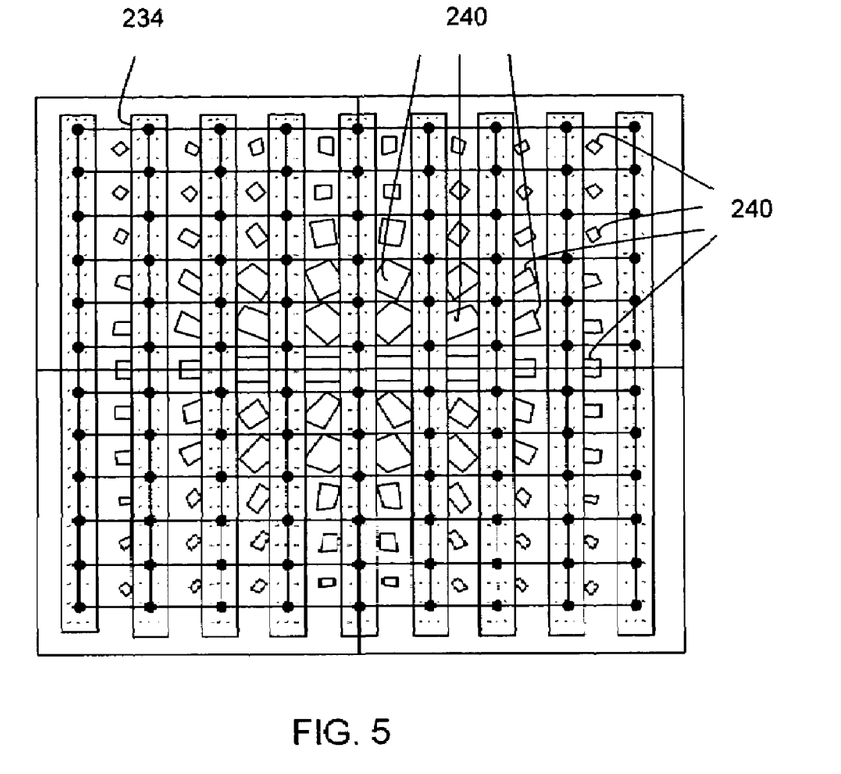
FIG. 5 is a simplified pictorial diagram representing arc lamp images projected on the second lenslet array of the light integrator of FIG. 4 in a prior art illumination system.

Assume, for example, a typical light source employing arc length a and reflector 220 of FIG. 3 combined with light integrator 230 of FIG. 4. FIG. 5 shows an array of arc images 240 projected from reflector 220, through first plate 232, and onto the lenslets of second plate 234 of light integrator 230. Note that the sizes of arc images 240 vary in area as a function of their reflection positions off reflector 220. Arc images 240 near the center of second plate 234 are relatively small, increase rapidly in area towards regions radially removed from the center, and dwindle in size near the periphery of second plate 234. Accordingly, FIG. 5 demonstrates that the system étendue is not efficiently (geometrically) filled with light.

Figure 6:
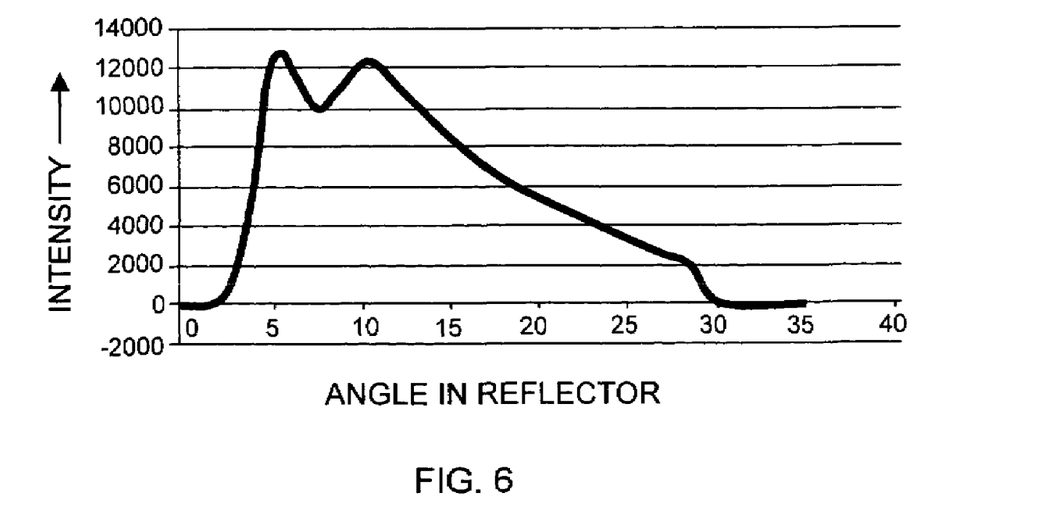
FIG. 6 is a graphical representation of light source intensity in a reflector as a function of an angle within the reflector in a prior art illumination system.

FIG. 6 shows a graph of light intensity as a function of reflection angle θ for an elliptical reflector, which explains why the sizes (areas) of arc images 240 vary. In particular, because of arc lamp shadowing, almost no light is reflected between zero and three degree reflection angles, which results in the "hole in the middle" effect seen in this type of arc lamp and reflector combination. Light intensity double-peaks between 5 and 12 degrees and gradually diminishes out to 30 degrees. This effect becomes more pronounced as the étendue of a projector is decreased.

What is still needed, therefore, is an illumination system which achieves a suitable light collecting efficiency at a small étendue. More particularly, what is needed is a reflector based illumination system in which the arc image remains substantially constant in area as a function of reflection angle θ. Such an illumination system would be advantageous in designing a compact, lightweight, and/or low-profile multimedia projection system that achieves a bright and/or high-quality projected image at preferably a relatively low cost.

DETAILED DESCRIPTION OF EMBODIMENTS

Embodiments of the present invention include, but are not limited to, an illumination system that achieves a suitable light-collecting efficiency at a small étendue for use in multimedia projection systems. The design and advantages of the present invention will become apparent from the detailed description of various embodiments given hereinafter. However, it should be understood that the detailed description and specific examples, while indicating preferred embodiments of the invention, are given by way of illustration only, and are not restrictive. Various modifications within the scope of this invention will become apparent to those skilled in the art from the detailed description of the various embodiments.

The design and advantages of the embodiments described herein are applicable to single- and multi-path projector systems employing any of various reflective or transmissive light valve types as well as prism-based and non-prism-based optical path architectures. In particular, significant advantages are achieved in reduced étendue color video projection systems.

The prior art reflector of FIG. 1 was evaluated on the basis of measuring light intensity as a function of reflection angle. However, another way to model reflector performance is in terms of magnification of the arc image. Prior art reflectors typically have a significant amount of angle-dependent distortion (coma), whereas what is needed is a reflector that has an angle-independent magnification, resulting in a low amount of coma.

Figure 7:
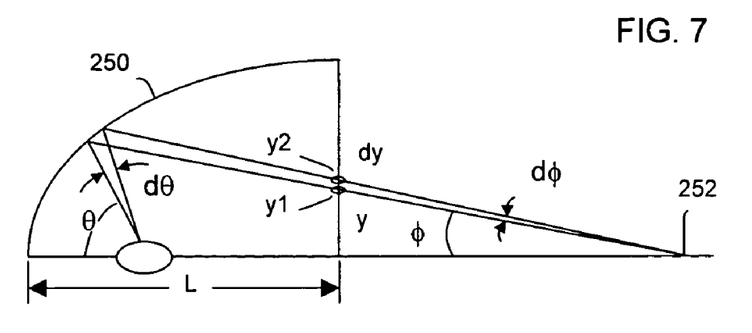
FIG. 7 is a simplified pictorial diagram representing parameters defining reflection angles of two light rays propagating through a reflector.

Referring to FIG. 7, magnification m of a reflector 250 can be represented by Eq. 6.

$$m(\theta) = \frac{d\theta}{d\phi} \qquad \text{Eq. 6}$$

Two rays (angles $\theta$ and $\theta+d\theta$) are shown exiting reflector 250 at locations y1 and y2 and go to focal point 252 at converging angles $\phi$ and $\phi+\delta\phi$. Angle $d\phi$ can be represented as shown in Eq. 7:

$$d\phi = \phi_2 - \phi_1 = \arctan\left(\frac{y_2}{L}\right) - \arctan\left(\frac{y_1}{L}\right), \qquad \text{Eq. 7}$$

where L is the reflector length.

For elliptical reflectors having a large length L, (nearly a parobola) L becomes large and $\arctan(\phi)$ approximately equals $\phi$.

Under those conditions, $d\Phi=C_1(y_2-y_1)$, which with a constant $C_1$ provides for the magnification of the reflector to be represented by Eq. 8.

$$m(\theta) = \frac{1}{C_1} \frac{d\theta}{dy} \qquad \text{Eq. 8}$$

Figure 8:
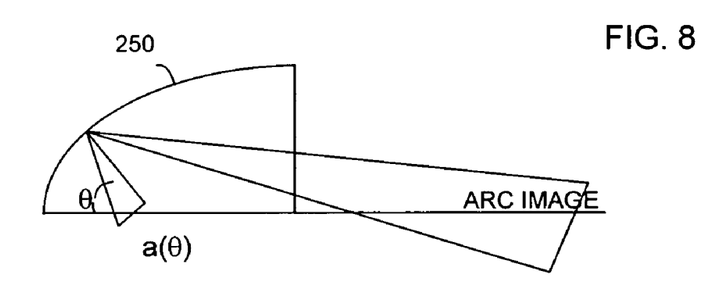
FIG. 8 is a simplified pictorial diagram representing parameters defining magnification by a reflector of the reflection of a light source arc, in accordance with one embodiment of this invention.

Recall that what is needed is a reflector based light source in which the arc image remains substantially constant in area as a function of reflection angle $\theta$. FIG. 8 represents a two-dimensional model of reflector 250 in which the arc image maintains a substantially constant area as a function of reflection angle $\theta$, in accordance with one embodiment of this invention. For this model to work, $m(\theta)$ should be inversely proportional to the projected arc size $a(\theta)$. This relationship is represented by Eq. 9.

$$m(\theta) = C_2 \frac{1}{a(\theta)} \qquad \text{Eq. 9}$$

Combining the two magnification equations, Eq. 8 and Eq. 9, provides Eq. 10, which is a way to solve for $y(\theta)$:

$$y(\theta) = C_3 \int_{\theta_{min}}^{\theta} a(\theta')d(\theta') + y(\theta_{min}), \qquad \text{Eq. 10}$$

where $$C_3 = \frac{1}{C_1 C_2},$$

so that $y(\theta_{max})=Y_{max}$ $\theta_{min}$ is the smallest angle at which light can be collected, which is useful for filling the "hole in the middle" with light by redirecting light toward $y(\theta_{min})=0$.

Figure 9:
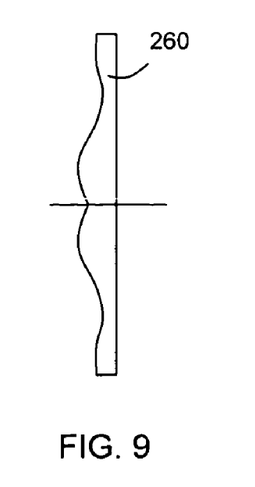
FIG. 9 is a simplified pictorial sectional representation of an optical corrector plate employed in accordance with one embodiment of this invention.

Referring to FIG. 9, because light exiting a reflector usually requires collimation, the reflector cannot simultaneously control light ray height and direction. Therefore, in one embodiment, an aspherical corrector lens 260 is employed to complete the light source system.

Figure 10:
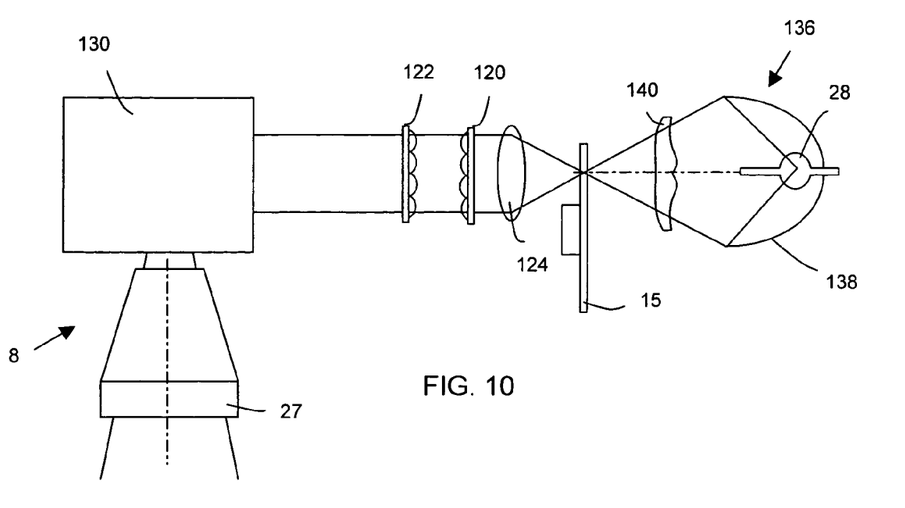
FIG. 10 is a simplified pictorial plan view of a multimedia projector system with an optical corrector plate for improved illumination efficiency, in accordance with one embodiment of this invention.

FIG. 10 shows one embodiment of the present invention, used in a multi-media projector 8, which improves light collection efficiency from a light source 136. The light source of this embodiment includes an arc lamp 28 mounted at the focus of a reflecting device 138. In various embodiments the reflecting device may be a free-form, ellipsoid, or a paraboloid reflector. Polychromatic light from arc lamp 28 is reflected by the reflecting device 138 and focused through an optional color wheel 15 by an aspherical corrector lens 140, which is shaped to reduce the typical "hole in the middle" illumination created by the "shadow" of arc lamp 28. Well-known numerical methods may be employed to design the contours of the reflecting device 138 and the aspherical corrector lens 140 such that illumination exiting the reflector and propagating through the corrector plate has a constant numerical aperture value as a function of reflection angle $\theta$.

In one embodiment the light emerging from the optional color wheel 15 is recollimated with an optional collimating lens 124 for propagation through first and second flyseye lenses 120 and 122. Aspherical corrector lens 140 and collimating lens 124 coact to efficiently collect light reflected by aspherical reflector 138, focus it through optional color wheel 15, and image it onto first flyseye lens 120 with minimum overfill. Because the light entering first flyseye lens 120 has a constant numerical aperture value as a function of reflection angle $\theta$, the arc images may have a substantially constant area across second flyseye lens 122 as well. Preferably, the light is imaged onto first flyseye lens 120 with an aspect ratio that matches the aspect ratio of the downstream reflective light valve. Because overfill is reduced or eliminated, optical components downstream of collimating lens 124 may be smaller and, therefore, lighter and less costly.

Although this embodiment describes a double flyseye lens integrator other embodiments of this invention may use a glass rod integrator or any other sufficiently effective integration device that provides a substantially uniform light distribution upon exiting the integrator.

Substantially uniformly distributed light exiting the flyseye lens integrator 122 enters a reflective light valve optical arrangement 130, such as, but not limited to, deflected mirror arrays and reflective liquid crystal light valves including either single- or multi-path architectures discussed above. Upon exiting the reflective light valve optical arrangement, modulated light travels to projector 27 which projects an output video image.

In various embodiments, outlet apertures of light integrator have cross-sectional aspect ratios that provide a projection display format that is compatible with conventional display standards. Some examples of display standards include SVGA (Super Video Graphics Array), XGA (Extended Graphics Array), SXGA (Super XGA), UXGA (Ultra XGA), and WUXGA (Widescreen Ultra XGA). These display standards are often a combination of resolution, color depth measured in bits, and refresh rate measured in hertz. SVGA, XGA, and UXGA all have aspect ratios of 4:3, that is the ratio between the width and the height of the image. SXGA has an aspect ratio of 5:4, and WUXGA is 16:10.

The illumination system of FIG. 10 is advantageous because it provides increased light collection efficiency at small étendues, which allows a suitably fast optical system while employing smaller and, therefore, less costly optical components. Small optical components are particularly useful for producing compact, lightweight portable projectors.

Figure 11:
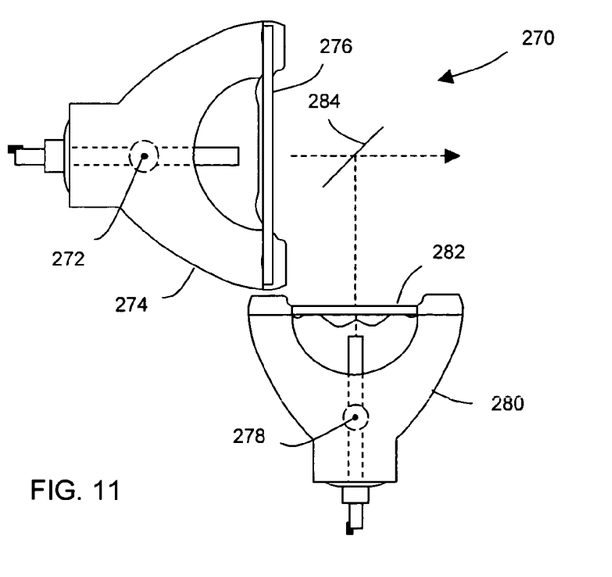
FIG. 11 is a simplified pictorial diagram representing a two-lamp light source with an optical corrector plate for improved illumination efficiency, in accordance with one embodiment of this invention.

FIG. 11 shows an embodiment of this invention which uses a multilamp light source 270 that efficiently maintains étendue by employing a first arc lamp 272 positioned within a diverging reflector 274 that has at its output a first corrector plate 276, and a second arc lamp 278 positioned within a converging reflector 280 that has at its output a second corrector plate 282. Second corrector plate 282 may be shaped like aspherical corrector lens 260 (FIG. 9) to fill the "hole in the middle" that would otherwise be generated by the first lamp, reflector, and corrector plate. A mirror 284 combines light rays propagated by the two lamps. Otherwise, the functionality of this embodiment is substantially the same as the FIG. 10 embodiment.

Figure 12:
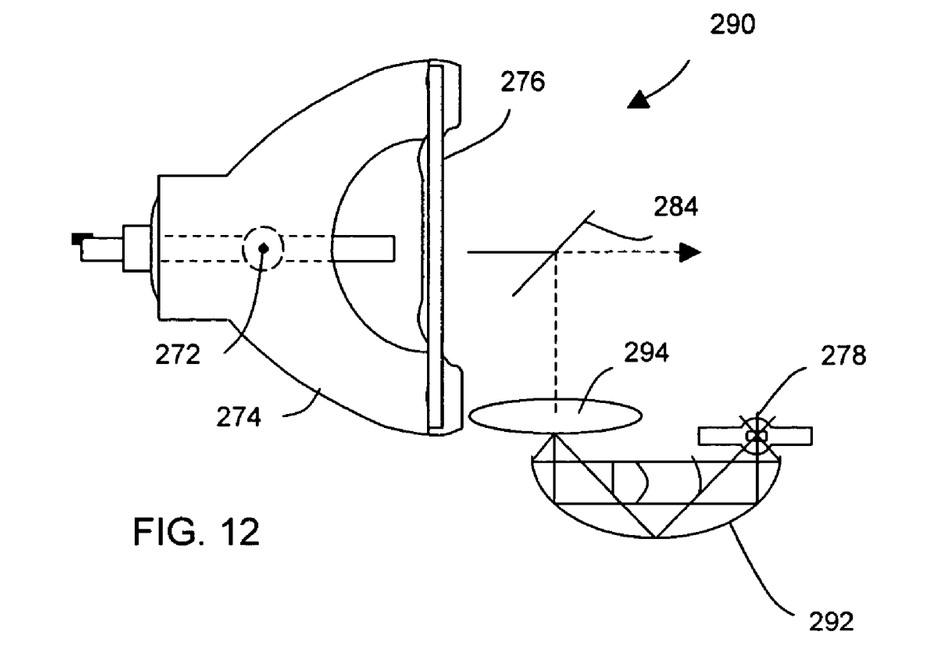
FIG. 12 is a simplified pictorial diagram representing a two-lamp light source with a dual paraboloid reflector for improved illumination efficiency, in accordance with one embodiment of this invention.

FIG. 12 shows another embodiment of this invention 290 in which converging reflector 280, in FIG. 11, is replaced by Strobel (not shown) or a dual paraboloid reflector 292, and second corrector plate 282 is replaced by a lens 294 to direct the light rays toward the mirror 284. Because the dual paraboloid reflector 292 used in this embodiment may not have the "hole in the middle" effect of the on-axis reflectors, there is no need for the second corrector lens. The light emanating from the reflector 292 may be focused by an optional lens 294 such that the intensity is increased to compensate for the decrease intensity due to the shadow cast by the first arc lamp. The light rays from the dual paraboloid reflector 292 are combined with the light rays from the diverging reflector 274 by the mirror 284. The combined light rays may have a substantially uniform intensity over the entire range of reflection angles.

Figure 13:
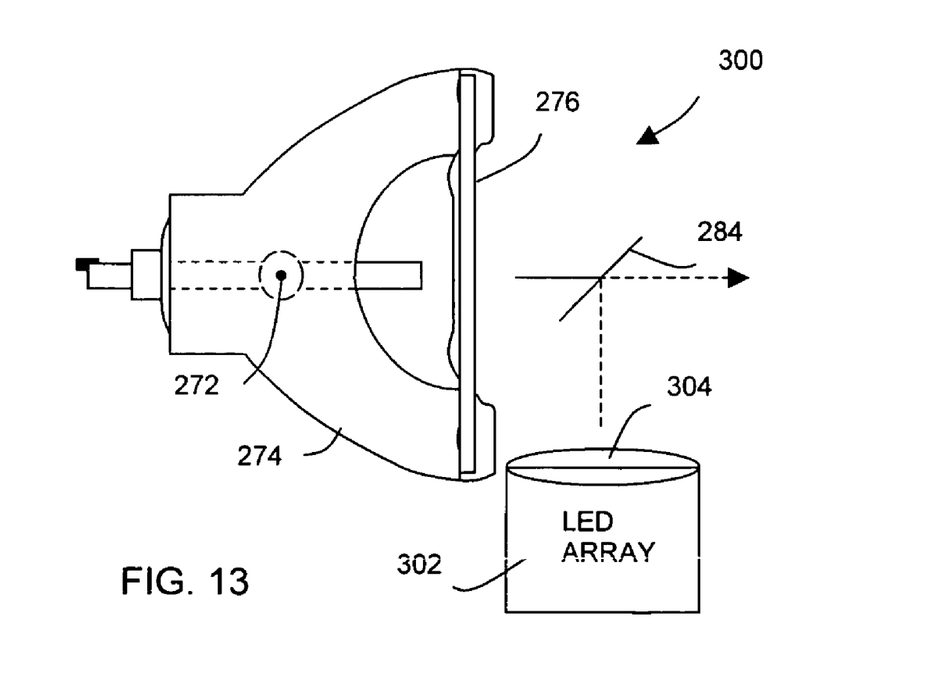
FIG. 13 is a simplified pictorial diagram representing a two-lamp light source with an LED array for improved illumination efficiency, in accordance with one embodiment of this invention.

FIG. 13 shows another alternative embodiment of this invention 300 in which second arc lamp 278 and converging reflector 280 is replaced by a red LED array 302, and second corrector plate 282 is replaced by a lens 304 to direct the light rays toward the mirror 284. The red light rays produced by red LED array 302 are advantageous because they provide a color balance to the blue dominant light rays produced by arc lamp 272. Otherwise the functionality of this embodiment is substantially the same as the FIG. 12 embodiment.

Multilamp light sources 270, 290, and 300 are advantageous because the "hole in the middle" of the illumination is filled, the arc size images at second integrator plate 122 (FIG. 10) are more uniformly sized for all lens elements, and up to 1.7 times as much light is collected than with conventional single-lamp light sources.

Figure 14:
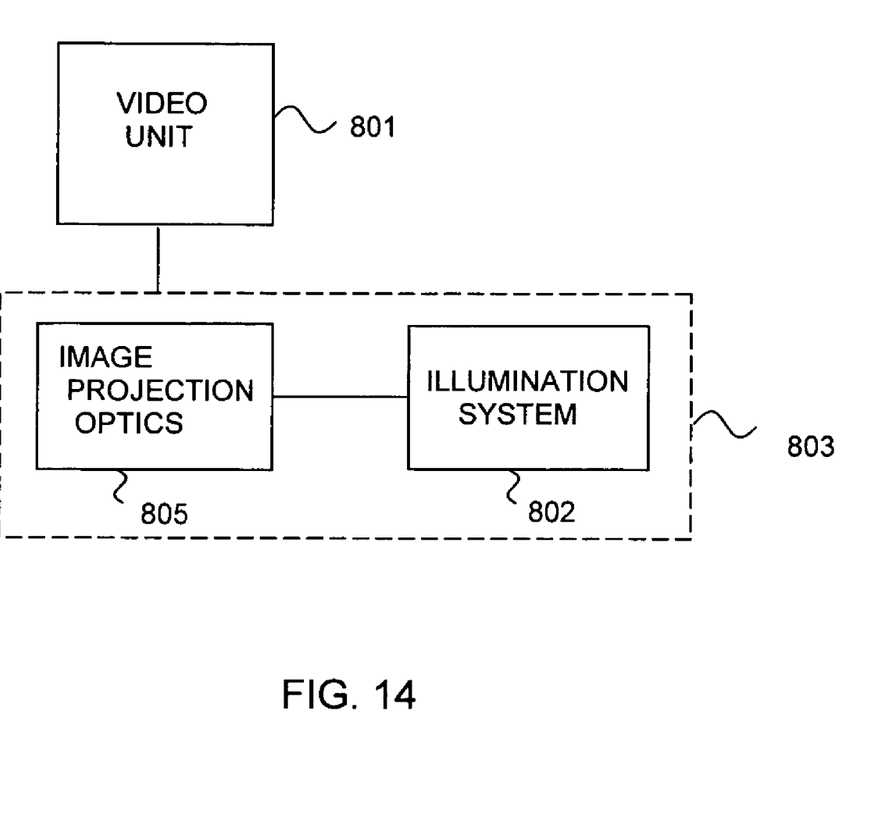
FIG. 14 is a simplified pictorial plan view of a video projection system showing a video unit coupled to a projection system that includes image projection optics and an illumination system, in accordance with one embodiment of this invention.

FIG. 14 shows another embodiment of this invention. In this embodiment a video unit 801 transmits video signals to the projection system 803, which includes image projection optics 805 and an illumination system 802. The illumination system may be any one of the various embodiments described under the teachings of this invention. In one embodiment the image projection optics 805 may be comprised of a reflective LCOS light valve optical arrangement. The video unit 801 may include a personal or laptop computer, DVD, set-top box (STB), video-camera, video recorder, or any other suitable device to transmit video signals to the projector.

Advantages of the multimedia projectors and light sources of this invention include, but are not limited to, lighter weight, smaller size, fewer and/or less costly components, and easier implementations than alternative approaches. The projectors of this invention are lighter weight partly because prisms are not necessarily required or, because of the small étendues made possible by light sources of this invention, much smaller prisms may be employed to obtain the same light transmission efficiency.

Moreover, there are performance advantages. The projectors of this invention offer higher image contrast because transflective polarizing beam splitters and small prisms have reduced birefringence issues, which are typically caused by residual or thermally induced stresses within large glass prisms. Finally, this invention enables implementing optical projectors having a faster f/#, resulting in higher luminous efficiency and more lumens (brightness) on the screen. This is due, in part, to the higher light collection efficiency of the small étendues made possible by this invention. For example, prior glass prisms were limited by optical coating designs to about f/2.5. However, the small étendues of this invention allow using such prisms at about f/2.0.

Skilled workers will recognize that various other portions of this invention may be implemented differently from the implementations described above for preferred embodiments. For example, minor optical path variations and additions may be necessary to correct for astigmatism, color aberrations, and other optical distortions. Also, the wavelength ranges, filters, wave plates, and other optical components may employ a wide variety of characteristics, mounting positions, spacings, dimensions, and aspect ratios that are suited to particular displays, such as rear projection, higher resolution, video only, and entertainment applications. UV and/or IR filters may be employed to protect components from damaging heat and radiation. The light source and illumination system embodiments may be used with multipath systems as well as the single-path systems shown and described.

It will be obvious to those having skill in the art that many other changes may be made to the details of the above-described embodiments of this invention without departing from the underlying principles thereof. The scope of this invention should, therefore, be determined only by the following claims.

What is claimed is:

1. A light source apparatus, comprising:
   at least a first reflecting device having a first optical axis;
   at least a first arc lamp having an arc positioned on the first optical axis, the arc producing first light rays that impinge on the first reflecting device at a first range of reflection angles measured between the optical axis and a point on the reflecting device where the first light rays impinge; and
   at least a first aspherical corrector plate positioned to receive the first light rays, with the first aspherical corrector plate being shaped to effectuate a substantially constant magnification of the first arc image in at least a portion of the first range of reflection angles.

2. The apparatus of claim 1, in which the first reflecting device includes a selected one of a free-form reflector, an ellipsoid reflector, and a paraboloid reflector.

3. The apparatus of claim 1, further comprising a light integrator having first and second lenslet arrays, the first lenslet array receiving the first light rays from the first corrector plate and casting a substantially constant area arc image of the first arc lamp on each lenslet of the second lenslet array.

4. The apparatus of claim 1, further comprising:
   said first reflecting device comprising a diverging reflector;
   a second reflecting device comprising a converging reflector having a second optical axis;
   a second arc lamp having an arc positioned on a second optical axis, the arc producing second light rays that impinge on the converging reflector at a second range of reflection angles measured between the second optical axis and a point on the converging reflector where the second light rays impinge; and
   a second aspherical corrector plate positioned to receive the second light rays, with the second aspherical corrector plate being shaped to effectuate a substantially constant magnification of the second arc image in at least a portion of the second range of reflection angles.

5. The apparatus of claim 4, further including a mirror that combines the first and second light rays and emits output light rays.

6. The apparatus of claim 5, further comprising a light integrator having first and second lenslet arrays, the first lenslet array receiving the output light rays and casting a substantially constant area arc image of the first and second arc lamps on each lenslet of the second lenslet array.

7. The apparatus of claim 4, in which the first light rays exiting the first aspherical corrector plate have a decreased intensity as the first range of reflection angles approaches zero degrees and in which the second light rays exiting the second aspherical corrector plate have an increased intensity as the second range of reflection angles approaches zero degrees.

8. The apparatus of claim 1, further comprising:
   a second reflecting device, including a selected one of a Strobel and dual paraboloid reflector, having a second optical axis;
   a second arc lamp having an arc positioned on the second optical axis, the second arc producing second light rays; and a lens positioned to direct the second light rays toward the first light rays.

9. The apparatus of claim 1, further comprising: a light emitting diode (LED) array producing second light rays propagating along a second optical axis; and a lens positioned to direct the second light rays toward the first light rays.

10. The apparatus of claim 9, in which the LED array produces red light rays.

11. A method for providing illumination, comprising:
    generating first light rays from a first arc lamp having a first arc;
    reflecting first light rays with at least a first reflecting device having a first optical axis, the first reflecting device being positioned such that the first arc is on the first optical axis, the light rays impinging on the first reflecting device at a first range of reflection angles measured between the optical axis and a point on the first reflecting device where the first light rays impinge; and
    positioning a first aspherical corrector plate to receive the first light rays, the first aspherical corrector plate providing a substantially constant magnification of the first arc image in at least a portion of the first range of reflection angles.

12. The method of claim 11, in which reflecting with at least a first reflecting device comprises reflecting the light rays employing a selected one of a free-form reflector, an ellipsoid reflector, and a paraboloid reflector.

13. The method of claim 11, further comprising:
    positioning a light integrator having first and second lenslet arrays, such that the first lenslet array receives the first light rays from the first aspherical corrector plate and casts a substantially constant area arc image of the first arc lamp on each lenslet of the second lenslet array.

14. The method of claim 11, further comprising:
    generating second light rays from a second arc lamp having a second arc;
    reflecting said second light rays with at least a second reflecting device having a second optical axis, the second reflecting device being positioned such that the second arc is on the second optical axis, the second light rays impinging on the second reflecting device at a second range of reflection angles measured between the second optical axis and a point on the second reflecting device where the second light rays impinge; and
    positioning a second aspherical corrector plate to receive the second light rays, the second aspherical corrector plate providing a substantially constant magnification of the second arc image in at least a portion of the second range of reflection angles.

15. The method of claim 14, further comprising:
    positioning a mirror to combine first and second light rays from the first and second aspherical corrector plates into output light rays.

16. The method of claim 15, further comprising:
    positioning a light integrator having first and second lenslet arrays, such that the first lenslet array receives output light rays and casts a substantially constant area arc image of the first and second arc lamps on the second lenslet array.

17. The method of claim 14, in which the first light rays exiting the first aspherical corrector plate have a decreased intensity as the first range of reflection angles approaches zero degrees and in which the second light rays exiting the second aspherical corrector plate have an increased intensity as the second range of reflection angles approaches zero degrees.

18. The method of claim 11, further comprising:
    generating second light rays from a second arc lamp;
    reflecting second light rays with second reflecting device towards the first light rays; and said second reflecting device being a selected one of a Strobel and dual paraboloid reflector.

19. The method of claim 11, further comprising: generating second light rays from a light emitting diode (LED) array; and positioning LED array such that second light rays intersect first light rays.

20. The method of claim 19, in which the LED array produces red light rays.

21. A projection system comprising:
an illumination system comprising at least a first reflecting device having a first optical axis; a first arc lamp having an arc positioned on the first optical axis, the arc producing first light rays that impinge on the first reflecting device at a first range of reflection angles measured between the optical axis and a point on the first reflecting device where the first light rays impinge; and
a first aspherical corrector plate positioned to receive the first light rays, with the first aspherical corrector plate being shaped to effectuate a substantially constant magnification of the first arc image in at least a portion of the first range of reflection angles;
a reflective light valve optical arrangement optically coupled to illumination system; and
a projection lens optically coupled to reflective light valve optical arrangement.

22. The projection system of claim 21, in which the reflective light valve optical arrangement comprises liquid crystal on silicon (LCOS) light valves.

23. The projection system of claim 21 in which the illumination system further comprises a light integrator optically coupled to first aspherical corrector plate.

24. The projection system of claim 21, in which the illumination system further comprises:
first reflecting device comprising a diverging reflector;
a second reflecting device comprising a converging reflector having a second optical axis;
a second arc lamp having an arc positioned on a second optical axis, the second arc producing second light rays that impinge on the converging reflector at a second range of reflection angles measured between the second optical axis and a point on the converging reflector where the second light rays impinge; and
a second aspherical corrector plate positioned to receive the second light rays, with second aspherical corrector plate shaped to effectuate a substantially constant magnification of the second arc image in at least a portion of the second range of reflection angles.

25. A system comprising:
a video unit with an output video signal; and
a projection system, coupled to video unit, to receive video signal and project video, said projection system comprising
an illumination system comprising at least a first reflecting device having a first optical axis;
a first arc lamp having an arc positioned on the first optical axis, the arc producing first light rays that impinge on the first reflecting device at a first range of reflection angles measured between the optical axis and a point on the first reflecting device where the first light rays impinge; and
a first aspherical corrector plate positioned to receive the first light rays, with the first aspherical corrector plate shaped to effectuate a substantially constant magnification of the first arc image in at least a portion of the first range of reflection angles;
a reflective light valve optical arrangement optically coupled to illumination system; and
a projection lens optically coupled to reflective light valve optical arrangement.

26. The system of claim 25 in which illumination system further comprises
first reflecting device comprising a diverging reflector;
a second reflecting device comprising a converging reflector having a second optical axis;
a second arc lamp having an arc positioned on a second optical axis, the arc producing second light rays that impinge on the converging reflector at a second range of reflection angles measured between the second optical axis and a point on the converging reflector where the second light rays impinge; and
a second aspherical corrector plate positioned to receive the second light rays, with the second aspherical corrector plate shaped to effectuate a substantially constant magnification of the second arc image in at least a portion of the second range of reflection angles.

27. The system of claim 26, in which the video unit is a selected one of a DVD, video camera, and set-top box.

28. The system of claim 26, in which the reflective light valve optical arrangement comprises at least a first liquid crystal on silicon (LCOS) light valve.

29. A light source apparatus, comprising:
at least a first reflecting device having a first optical axis;
at least a first arc lamp having an arc positioned on the first optical axis, the arc producing first light rays that impinge on the first reflecting device at a first range of reflection angles measured between the optical axis and a point on the reflecting device where the first light rays impinge;
at least a first aspherical corrector plate positioned to receive the first light rays, with the first aspherical corrector plate being shaped to effectuate a substantially constant magnification of the first arc image in at least a portion of the first range of reflection angles, wherein said first reflecting device comprises a diverging reflector;
a second reflecting device comprising a converging reflector having a second optical axis;
a second arc lamp having an arc positioned on a second optical axis, the arc producing second light rays that impinge on the converging reflector at a second range of reflection angles measured between the second optical axis and a point on the converging reflector where the second light rays impinge; and
a second aspherical corrector plate positioned to receive the second light rays, with the second aspherical corrector plate being shaped to effectuate a substantially constant magnification of the second arc image in at least a portion of the second range of reflection angles,
wherein the first light rays exiting the first aspherical corrector plate have a decreased intensity as the first range of reflection angles approaches zero degrees and wherein the second light rays exiting the second aspherical corrector plate have an increased intensity as the second range of reflection angles approaches zero degrees.

30. The apparatus of claim 29, in which the first reflecting device includes a selected one of a free-form reflector, an ellipsoid reflector, and a paraboloid reflector.

31. The apparatus of claim 29, further comprising a light integrator having first and second lenslet arrays, the first lenslet array receiving the first light rays from the first corrector plate and casting a substantially constant area arc image of the first arc lamp on each lenslet of the second lenslet array.

32. The apparatus of claim 29, further including a mirror that combines the first and second light rays and emits output light rays.

33. The apparatus of claim 32, further comprising a light integrator having first and second lenslet arrays, the first lenslet array receiving the output light rays and casting a substantially constant area arc image of the first and second arc lamps on each lenslet of the second lenslet array.

34. The apparatus of claim 29, further comprising:
a second reflecting device, including a selected one of a Strobel and dual paraboloid reflector, having a second optical axis;
a second arc lamp having an arc positioned on the second optical axis, the second arc producing second light rays; and
a lens positioned to direct the second light rays toward the first light rays.

35. The apparatus of claim 29, further comprising: a light emitting diode (LED) array producing second light rays propagating along a second optical axis; and a lens positioned to direct the second light rays toward the first light rays.

36. The apparatus of claim 35, in which the LED array produces red light rays.

37. A method for providing illumination, comprising:
generating first light rays from a first arc lamp having a first arc; reflecting first light rays with at least a first reflecting device having a first optical axis, the first reflecting device being positioned such that the first arc is on the first optical axis, the light rays impinging on the first reflecting device at a first range of reflection angles measured between the optical axis and a point on the first reflecting device where the first light rays impinge; and
positioning a first aspherical corrector plate to receive the first light rays, the first aspherical corrector plate providing a substantially constant magnification of the first arc image in at least a portion of the first range of reflection angles;
generating second light rays from a second arc lamp having a second arc;
reflecting said second light rays with at least a second reflecting device having a second optical axis, the second reflecting device being positioned such that the second arc is on the second optical axis,
wherein the second light rays impinging on the second reflecting device at a second range of reflection angles measured between the second optical axis and a point on the second reflecting device where the second light rays impinge; and positioning a second aspherical corrector plate to receive the second light rays, the second aspherical corrector plate providing a substantially constant magnification of the second arc image in at least a portion of the second range of reflection angles, wherein the first light rays exiting the first aspherical corrector plate have a decreased intensity as the first range of reflection angles approaches zero degrees and in which the second light rays exiting the second aspherical corrector plate have an increased intensity as the second range of reflection angles approaches zero degrees.

38. The method of claim 37, in which reflecting with at least a first reflecting device comprises reflecting the light rays employing a selected one of a free-form reflector, an ellipsoid reflector, and a paraboloid reflector.

39. The method of claim 37, further comprising:
positioning a light integrator having first and second lenslet arrays, such that the first lenslet array receives the first light rays from the first aspherical corrector plate and casts a substantially constant area arc image of the first arc lamp on each lenslet of the second lenslet array.

40. The method of claim 37, further comprising:
positioning a mirror to combine first and second light rays from the first and second aspherical corrector plates into output light rays.

41. The method of claim 40, further comprising:
positioning a light integrator having first and second lenslet arrays, such that the first lenslet array receives output light rays and casts a substantially constant area arc image of the first and second arc lamps on the second lenslet array.

42. The method of claim 37, further comprising:
generating second light rays from a second arc lamp;
reflecting second light rays with second reflecting device towards the first light rays; and
said second reflecting device being a selected one of a Strobel and dual paraboloid reflector.

43. The method of claim 37, further comprising:
generating second light rays from a light emitting diode (LED) array; and
positioning LED array such that second light rays intersect first light rays.

44. The method of claim 43, in which the LED array produces red light rays.

* * * * *